(12) United States Patent
Winchester (10) Patent No.: US 7,934,413 B2
(45) Date of Patent: May 3, 2011

(54) FLOWMETER CALIBRATION SYSTEM AND OPERATIONAL METHOD

(76) Inventor: James Edward Winchester, Estill Springs, TN (US)

(*) Notice: Subject to any disclaimer, the term of this patent is extended or adjusted under 35 U.S.C. 154(b) by 380 days.

(21) Appl. No.: 11/778,280

(22) Filed: Jul. 16, 2007

(65) Prior Publication Data

US 2009/0019914 A1    Jan. 22, 2009

(51) Int. Cl.
*G01F 25/00* (2006.01)
(52) U.S. Cl. ......................................................... 73/1.21
(58) Field of Classification Search .................... 73/1.19, 73/1.21
See application file for complete search history.

(56) References Cited

U.S. PATENT DOCUMENTS

| | | | | |
|---|---|---|---|---|
| 3,098,382 A * | 7/1963 | Hoffman et al. | ................ | 73/168 |
| 3,756,456 A * | 9/1973 | Georgi | ................ | 222/1 |
| 3,817,082 A * | 6/1974 | Fletcher et al. | ................ | 73/1.21 |
| 4,307,601 A * | 12/1981 | Jackson | ................ | 73/1.22 |
| 4,507,952 A * | 4/1985 | Mathieu | ................ | 73/1.19 |
| 4,674,317 A * | 6/1987 | Cohrs et al. | ................ | 73/1.21 |
| 4,829,808 A * | 5/1989 | West | ................ | 73/1.17 |
| 5,111,682 A * | 5/1992 | Halpin | ................ | 73/1.19 |

* cited by examiner

*Primary Examiner* — Hezron Williams
*Assistant Examiner* — Nashmiya Fayyaz (57) ABSTRACT

Disclosed is a bi-directional piston displacement type volumetric fluid flow rate delivery and metering system (calibration standard) and operational method for calibration of fluid flowmeters. The present invention provides reduced uncertainty of delivered volumetric fluid flow rate at meters under test relative to the uncertainty of volumetric fluid flow rate at meters under test provided by prior art bi-directional piston displacement type volumetric fluid flow rate standards given the same nominal cylinder diameters and working fluid and equal dimensional, timing and temperature measurement uncertainties by employing a plurality of metering pistons and cylinders to minimize the connecting volume piping between the metering piston cylinder outlet and meters under test, providing open access to one side of each metering piston to accomplish installation of temperature probes through the pistons into the working fluid and by operational method which minimizes the connecting volume to standard volume ratio.

5 Claims, 4 Drawing Sheets

FLOWMETER CALIBRATION SYSTEM AND OPERATIONAL METHOD

FIELD OF THE INVENTION

The present invention relates to a laboratory calibration system and operational method for characterization of fluid flowmeters. Specifically, the present invention is an improved system and operational method over prior art bi-directional piston displacement type volumetric fluid flow rate standards providing reduced uncertainty of volumetric fluid flow rate delivered to a meter under test over what can be achieved with prior art bi-directional piston displacement type volumetric fluid flow rate standards given the same nominal cylinder diameter and working fluid and equal dimensional, timing and temperature measurement uncertainties. Working fluid is defined as the fluid that is metered and passed through a flowmeter being calibrated. A flowmeter being calibrated is herewith referred to as a flowmeter under test or simply a meter under test.

BACKGROUND OF THE RELATED ART

Delivering volumetric fluid flow to a meter under test by metering the fluid flow via timed displacement of a piston moving in a cylinder of known cross section has been an accepted method of flowmeter calibration for many years. Edward E. Francisco, Jr. disclosed a system and method for such an apparatus in U.S. Pat. No. 3,403,544 and in U.S. Pat. No. 3,492,856. Francisco, Jr. teaches the use of a plurality of pistons in a single cylinder to save time by sending first one then a second piston and so on through the calibrated cylinder to accomplish a plurality of test runs before having to return the pistons to the starting end of the cylinder. These earlier disclosed devices are unidirectional piston displacement type volumetric flow rate standards. Fluid flow to a meter under test is metered as the piston moves in the cylinder in one direction. A disadvantage of the apparatus disclosed by Francisco that is overcome by the present invention is the requirement that after the metering pistons have completed a metering run down the cylinder, they must be returned fully to the opposite end of the cylinder before an additional metering run can occur. Lost calibrating time occurs while waiting for the metering pistons to make the transit back to their starting positions. The present invention utilizes timed piston displacement in a cylinder of known cross section to meter volumetric fluid flow rate as do these prior art inventions, but differs substantially from them by virtue of metering the fluid flow rate via bi-directional piston movement and the use of a plurality of cylinders, each with a metering piston therein resulting in improved flowmeter calibrations.

J. H. Hoffman et al disclosed a bi-directional piston displacement type flow and other hydraulic parameter test device in U.S. Pat. No. 3,098,382. A plurality of pistons and cylinders comprise the system disclosed by Hoffman et al. One cylinder with a piston functions only as an actuator while the second cylinder with a piston is the test cylinder used to deliver working fluid to a test component. The present invention differs from that disclosed by Hoffman et al in that the plurality of pistons and cylinders of the present invention are all standards or test cylinders as denoted by Hoffman et al, each cylinder having a metering piston and functioning collectively to reduce the connecting volume of piping required to couple a meter under test to the flow being delivered by a bi-directional piston displacement type volumetric flow rate standard. Reduced volume of piping connecting a flowmeter to the metering cylinder, as achieved with the current invention, provides improved uncertainty of delivered fluid flow at a meter under test over what can be achieved with the apparatus of Hoffman et al. Additionally, working fluid is applied to both sides of the piston in the test or metering cylinder of the invention of Hoffman et al. The present invention applies working fluid to only one side of each piston in the plurality of metering cylinders differing substantially from and providing the ability to measure working fluid temperature adjacent to a metering piston which is an additional non-obvious improvement over the invention of Hoffman et al and all other similar prior art.

Georgi disclosed in U.S. Pat. No. 3,756,456 an apparatus and method for metering and delivering a fluid volume comprising a plurality of cylinders with pistons. One cylinder with a piston in the apparatus disclosed by Georgi is a volumetric pump while the second cylinder with a piston is a bi-directional actuator. Moving in one direction as driven by the actuator, the volumetric pumping cylinder pulls a fluid from a reservoir into the volumetric pumping cylinder. Driven in the opposite direction the volumetric pumping cylinder discharges the fluid to an outside receptacle. The apparatus disclosed by Georgi only meters a volume of fluid and does not consider time of delivery of that volume of fluid to determine a fluid flow rate as does the current invention. The plurality of cylinders with pistons disclosed by Georgi each have different function and do not collectively function in a manner suitable for the calibration of fluid flowmeters as does the current invention. Working fluid is handled in only a single cylinder of the apparatus disclosed by Georgi while in the current invention all of the plurality of cylinders with pistons receive and discharge working fluid and bi-directionally meter the flow of that working fluid with the advantages of near continuous delivery to a flowmeter under test and improved uncertainty of fluid flow rate delivered to said flowmeter under test relative to the flow rate delivered by prior art bi-directional piston displacement type flow rate standards.

Fletcher et al disclosed in U.S. Pat. No. 3,817,082 an apparatus for establishing flow of gaseous fluid in a test section which utilizes a plurality of cylinders with pistons. The pistons in the plurality of cylinders of the apparatus disclosed by Fletcher et al are both driven simultaneously in the same direction to produce two separate flows. One flow is a core flow through a test section while the second flow is the flow near the boundary of the flow chamber walls up steam of the test section. Boundary flow is separated from the core flow by a scavenging means connected to the suction side of the smaller of the flow producing cylinders with a piston. The purpose of the scavenging of boundary flow from the total flow is to liberate the core flow from the effects of the lower velocity boundary flow. The plurality of cylinders and pistons in the apparatus disclosed by Fletcher et al do not function in the manner of the plurality of cylinders and pistons of the current invention to bi-directionally establish a single fluid flow rate through a flowmeter under test derived from a single flow rate metered by piston displacement. The plurality of cylinders with pistons of the apparatus disclosed by Fletcher et al produce a desired test section flow only when driven unidirectionally and do so by discharging working fluid from one side of the pistons while receiving working fluid return flow on the opposite side of the pistons. The current invention both receives and discharges a single flow of working fluid on only one side of the metering pistons in the plurality of cylinders and does so with bi-directional movement of the pistons. Additionally, the current invention is usable with both gaseous and liquid fluids.

Francisco, Jr. later disclosed a piston displacement type volumetric flow rate standard in U.S. Pat. No. 4,152,922 which consists of a plurality of cylinders with pistons. One piston in a larger cylinder is identified as the measuring piston and the second piston in a smaller cylinder is identified as the retracting piston which is coupled to and utilized to return the measuring piston to the starting position after it has completed a unidirectional measuring run to the opposite end of the measuring cylinder. A disadvantage of the apparatus disclosed by Francisco that is overcome by the present invention is the requirement that after the metering piston has completed a metering run down the cylinder, the piston must be returned fully to the opposite end of the cylinder before an additional metering run can occur. Lost calibrating time occurs while waiting for the metering piston to make the transit back to the starting position. The plurality of pistons and cylinders disclosed in U.S. Pat. No. 4,152,922 differ substantially in function and purpose from the plurality of pistons and cylinders disclosed in the present invention in that the plurality of pistons and cylinders of the present invention meter fluid flow bi-directionally and all are utilized for metering of fluid flow.

Jackson disclosed an apparatus for calibrating flowmeters in U.S. Pat. No. 4,307,601. The apparatus disclosed by Jackson utilizes a piston in a cylinder to meter fluid flow coupled by a cable over a pulley to a counterweight situated in a second cylinder. The plurality of cylinders in the apparatus disclosed by Jackson each have different functions. One cylinder with a metering piston serves to measure the fluid flow entering that cylinder while the second cylinder simply protects a counterweight serving to offset the force of gravity acting on the metering piston in the other cylinder and reduce pressurization of the fluid lifting the metering piston. Actual working fluid does not flow into or out of the second cylinder housing the counterweight. The apparatus disclosed by Jackson can only work properly with the cylinders in or very near the vertical position which facilitates the counterweight offsetting the force of gravity on the metering piston. The apparatus disclosed by Jackson does not provide the fluid flow motivation means. The apparatus disclosed by Jackson is limited in use for only gaseous fluid flow. The apparatus disclosed by Jackson does not provide the benefits gained by the use of a plurality of cylinders each with a metering piston therein as provided by the current invention.

Mathieu discloses in U.S. Pat. No. 4,507,952 a bi-directional piston displacement type volumetric flow rate standard with a jacket over the cylinder to provide a passage through which a flow of working fluid around the metering cylinder takes place during operation to equalize the temperature of the metering cylinder with the working fluid. This process additionally provides near equal pressure on both sides of the metering cylinder wall which reduces the effect of working fluid pressure on the metering cylinder cross sectional area. Mathieu also discloses a pressurization means to the downstream side of a meter under test to avoid vaporization of the working fluid during flowmeter calibrations when the working fluid is liquid. Preferred embodiments of the present invention incorporate these teachings of Mathieu. Temperature equalization, control of liquid fluid pressure above the vapor point throughout the flow circuit and pressure equalization on both sides of the metering cylinder wall are best practices in the art. The present invention represents an improvement in the accuracy of delivered flow rate to a meter under test over what can be accomplished in the disclosed invention of Mathieu. The improvement is achieved by quantifying and accounting for the thermal effects to fluid density passing through the connecting volume between the metering piston and meter under test during standard volume delivery and by significantly reducing the connecting volume to standard volume ratio by both operational method and physical reduction of the required connecting volume piping for a bi-directional piston displacement type volumetric flow rate standard as well as by providing temperature measurement of the working fluid adjacent to the metering pistons. Connecting volume is defined as the sum of fluid volume in piping connecting the metering cylinder outlet with the inlet to the flowmeter under test and the residual volume of fluid in the cylinder between the cylinder outlet and the metering piston at the end of standard volume delivery. Standard volume is defined as the volume of fluid delivered from the calibration apparatus to a flowmeter under test during the collection of a single data point from the flowmeter under test.

Cohrs et al disclose a piston displacement type volumetric fluid flow rate standard in U.S. Pat. No. 4,627,267 which incorporates a plurality of pistons and cylinders in the process. As in both U.S. Pat. No. 3,098,382 and U.S. Pat. No. 4,152,922 the plurality of pistons and cylinders comprise first a single measuring cylinder and secondly what is referred to as an actuating cylinder, retracting piston or control piston. A disadvantage of the apparatus disclosed by Cohrs et al that is overcome by the present invention is the requirement that after the metering piston has completed a metering run down the cylinder, the piston must be returned fully to the opposite end of the cylinder before an additional metering run can occur. Lost calibrating time occurs while waiting for the metering piston to make the transit back to the starting position. The present invention incorporates a plurality of pistons and cylinders each of which functions bi-directionally as a metering device and which work collectively to reduce the connecting volume between the metering piston and the meter under test. The plurality of pistons and cylinders disclosed in the present invention function substantially different from and with the advantage of faster and higher accuracy flowmeter calibration relative to the plurality of pistons and cylinders disclosed by Cohrs et al in U.S. Pat. No. 4,627,267 and other similar prior art.

U.S. Pat. No. 4,627,267 further discloses a metering piston displacement measurement process incorporating a shaft attached to and moving with the metering piston and carrying an optical encoder head which moves relative to an inscribed linear ruler surface to produce a pulsed electrical signal with the number of pulses representing directly the linear axial displacement of the metering piston. Preferred embodiments of the present invention incorporate the use of such an optical encoder as the means to accurately measure the metering piston displacement during flowmeter calibration operations. Also disclosed in U.S. Pat. No. 4,627,267 is a position sensor. This position sensor relates to the position of a seal leak detection device and is substantially different from the position sensor disclosed in the present invention. The position sensor of the present invention is utilized to determine the position of the metering piston relative to the discharge end of the cylinder in which it is traveling for the purpose of positioning the metering piston to a proper starting position, traversing the metering piston to the discharge end of the cylinder during delivery of a standard volume and determining the fluid volume in the cylinder between the piston and cylinder discharge (dead volume) at the end of a standard volume delivery. These functions in the current invention collectively contributing to the improved uncertainty of fluid flow rate delivered to a flowmeter under test relative to the uncertainty of flow rate delivered to a flowmeter under test by prior art bi-directional piston displacement type flow rate standards while reducing the time to calibrate flowmeters under test.

Cohrs et al later disclosed in U.S. Pat. No. 4,674,317 an apparatus for determining the flow characteristic of a volumetric flowmeter which utilizes a plurality of cylinders with pistons. One cylinder with a piston therein is utilized to unidirectionally meter the flow of working fluid. A second cylinder with a piston therein is a control divice coupled to and used to drive the metering piston in the first cylinder. The plurality of cylinders with pistons in the apparatus disclosed by Cohrs et al do not function to facilitate bi-directional metering of working fluid flow and do not function to improve the uncertainty of flow rate delivered to a flowmeter under test by reducing connecting volume requirement as do the plurality of cylinders with pistons of the current invention. A disadvantage of the apparatus disclosed by Cohrs et al that is overcome by the present invention is the requirement that after the metering piston has completed a metering run down the cylinder, the piston must be returned fully to the opposite end of the cylinder before an additional metering run can occur. Lost calibrating time occurs while waiting for the metering piston to make the transit back to the starting position.

West disclosed in U.S. Pat. No. 4,829,808 a flowmeter prover apparatus and method which utilizes a plurality of cylinders with pistons. Flowmeter provers are not laboratory standards, but are field standards employed for in place proving of the accuracy of an installed flowmeter. In the apparatus disclosed by West, one cylinder with a piston therein is utilized to unidirectionally meter fluid flow after being plumbed in series with a flowmeter under test. A second cylinder with piston is coupled to the metering piston and serves to dampen the acceleration and movement of the metering piston through the metering cylinder. Working fluid does not flow into or out of the second cylinder with piston therein and does not serve to meter fluid flow. A third cylinder with a piston therein is utilized to supply a fluid under pressure into a space between seals on the metering piston. This third cylinder with a piston therein is not utilized to meter working fluid flow, but is a means for improving the function of the seals on the single metering piston. Working fluid does not flow into or out of the third cylinder with piston of the apparatus disclosed by West. The plurality of cylinders with pistons therein of the apparatus disclosed by West do not function to facilitate bi-directional metering of working fluid and do not function to reduce the required connecting volume between a metering piston and a flowmeter under test as do the plurality of cylinders with pistons of the current invention.

Halpin discloses in U.S. Pat. No. 4,854,154 and again in U.S. Pat. No. 5,111,682 a piston displacement type volumetric fluid flow rate standard for flowmeter calibration. The systems disclosed by Halpin are for unidirectional piston displacement operation and differ substantially from the present invention. A disadvantage of the apparatus disclosed by Halpin that is overcome by the present invention is the requirement that after the metering piston ha's completed a metering run down the cylinder, the piston must be returned fully to the opposite end of the cylinder before an additional metering run can occur. Lost calibrating time occurs while waiting for the metering piston to make the transit back to the starting position. The current invention facilitates bi-directional metering of fluid flow by the pistons slidably mounted in the plurality of cylinders and further employs a method of controlling the end point and starting point of metering pistons during standard volume delivery to both produce a standard volume of sufficient quantity to assure meeting a predetermined level of flow rate uncertainty while minimizing that required quantity with the ending point being at a position in the metering cylinder nearest to the cylinder discharge. The conduit piping volume between the metering cylinder discharge and the flowmeter under test is also minimized in the current invention to further reduce the required standard volume quantity necessary to meet a predetermined uncertainty of flow rate at the flowmeter test and thus reduce to time to deliver that standard volume quantity.

Halpin does disclose in U.S. Pat. No. 4,854,154 the use of a reservoir means with pressurized gas over liquid fluid therein to maintain a near constant fluid pressure. This being similar to the pressurization means disclosed by Mathieu in U.S. Pat. No. 4,507,952 to prevent liquid fluid pressure from falling below vapor pressure. Preferred embodiments of the present invention include the pressurized reservoir means to prevent vaporization of liquid working fluid at any location in the process and in particular the prevention of liquid fluid vaporization at the trailing edges of turbine flowmeter blades when such flowmeters are meters under test. Avoiding fluid vaporization when the working fluid is a liquid is required for proper calibration operation. The teachings of Mathieu and Halpin regarding the use of a reservoir with gas over liquid pressurization to prevent working fluid vaporization are best practices in the art.

SUMMARY OF THE INVENTION

Fluid flowmeters require characterization of their response to flowing fluid in order to be properly utilized. Simply put, in order for a flowmeter to be used to accurately measure the flow rate of a given fluid, the flowmeter must first be subjected to a characterization process (calibration) which determines how the subject flowmeter responds to the particular fluid type to be metered over a range of flow rates. The level of uncertainty to which a flowmeter can be calibrated depends on a number of factors including the uncertainty of the fluid flow rate delivered by the standard used in the calibration process. As a rule of thumb, the calibration standard should be 4 times more accurate than the flowmeter being calibrated to provide a 95% confidence in readings taken from the flowmeter when it is placed into service. With extensive knowledge of the process applied and rigorous uncertainty analysis thereof, rules of thumb regarding the test uncertainty ratio (TUR) between the calibration standard and process and the flowmeter calibrated can be downwardly adjusted. However, in no case can the uncertainty of measurement for a given flowmeter be considered better than the standard and process against which it has been calibrated. As fluid flowmeters are improved and made to be capable of lower measurement uncertainty, the need for improved fluid flow rate calibration standards and operational methods grows.

Prior art bi-directional piston displacement type volumetric fluid flow rate standards for calibration of fluid flowmeters do not provide optimization of calibration method to minimize the uncertainty of flow rate at meters under test for each delivered standard volume of fluid. Prior art bi-directional piston displacement type volumetric fluid flow rate standards for calibration of fluid flowmeters do not determine the total connecting volume value and calculate the connecting volume to standard volume ratio and all thermal effects associated with the connecting volume during standard volume delivery. Prior art bi-directional piston displacement type volumetric fluid flow rate standards for calibration of fluid flowmeters do not control the standard volume value on the basis of temperature measurement uncertainty, connecting volume value and fluid and connecting volume piping thermal expansion coefficients and other physical parameters contributing to uncertainty to assure that each delivered standard volume achieves a predetermined level of uncertainty for the average volumetric fluid flow rate at the meter under test.

Accordingly, the present invention has been made to overcome the above mentioned shortcomings arising from conventional prior art technologies, and the objective of the present invention is to provide improved calibration results for fluid flowmeters over what can be provided by the prior art bi-directional piston displacement type volumetric fluid flow rate calibration system technologies. The present invention provides the means for reduced uncertainty of delivered fluid volumetric flow rate to a meter under test (MUT) and a method of improved fluid flowmeter calibration over what is now provided by prior art bi-directional piston displacement type fluid flowmeter calibration systems by reducing the connecting volume piping between the metering cylinder outlet and meters under test, provision to measure working fluid temperature at the metering pistons, controlling the standard volume delivery process to minimize the dead volume in the cylinder through which the metering piston traverses for each standard volume delivery, quantifying the connecting volume thermal stability effects factor during standard volume delivery and controlling the standard volume quantity to assure the achievement of a predetermined level of uncertainty for the average volumetric fluid flow rate at the meter under test. Dead volume in the cylinder is defined as the fluid volume between the metering piston and the discharge port of the metering cylinder at the completion of a standard volume delivery.

Piston displacement type fluid flow rate standards work by movement of a fluid barrier piston in a cylinder of known cross sectional area. The displacement distance of piston movement times the cross sectional area of the cylinder determines a displaced volume. From the measured time required for the piston movement and known displaced volume, the average flow rate of fluid at the metering piston is derived. Bi-directional piston displacement type fluid flow rate standards deliver flowing fluid uni-directionally to a meter under test regardless of the direction of piston movement in the cylinder. This is accomplished by employing valves which appropriately block and direct flow depending on the direction of the metering piston movement. An arrangement of piping between the cylinder ends, valves and MUT is also involved. The interior volume of the piping and valves between the cylinder end discharging fluid and the meter under test summed with the volume in the cylinder between the metering piston and cylinder discharge at the end of standard volume delivery is referred to as the connecting volume.

Uncertainty in the flow rate of fluid generated by the axial movement of the metering piston in the cylinder is derived from a combination of the uncertainties of cylinder cross sectional area, piston displacement distance measurement and the measurement of time of piston travel. The volumetric flow rate of fluid at the meter under test is related to the volumetric flow rate of fluid at the metering piston by a number of factors including any leakage of fluid around the piston or into or out of the volume between the metering piston and meter under test. These leakage parameters are considered detectable and cause to stop operation and administer repairs prior to continuing with any calibration operations using a piston displacement type flow rate standard. When calculating delivered fluid flow rate to a meter under test, leakage of fluid will not be considered since inspection for and correction of any leaks is considered to be the only acceptable operational practice with a fluid flow rate standard of the type being considered here. Without consideration for fluid leakage, the equation relating average volumetric fluid flow rate at a meter under test to the average volumetric fluid flow rate at the metering piston is given in Equation 1 below.

$$\overline{V}_{MUT} = \overline{V}_{STD} \left\{ 1 + \beta(\overline{T}_{MUT} - \overline{T}_{PIST}) + \frac{V_{CV}}{V_{STD}} \begin{bmatrix} \beta(\langle T_{CVFf}\rangle - \langle T_{CVFi}\rangle) - \\ 3\alpha_S(\langle T_{CVMf}\rangle - \langle T_{CVMi}\rangle) \end{bmatrix} \right\} \quad (1)$$

Where $\overline{V}_{MUT}$=The time average volumetric fluid flow rate at the meter under test during delivery of the standard volume $\overline{V}_{STD}$=The time average volumetric fluid flow rate at the metering piston during delivery of the standard volume β=the volumetric thermal expansion coefficient of the fluid in the calibration system about the nominal operating temperature at constant pressure as determined by equation 2 below $$\beta = \frac{1}{V}\frac{\partial V}{\partial T}\bigg|_P = \frac{-1}{\rho}\frac{\partial \rho}{\partial T}\bigg|_P \quad (2)$$

$V_{CV}$=The connecting volume between the meter under test and the piston, equal to the sum of the piping volume from the cylinder discharge port to the meter under test and the volume in the cylinder between the piston at the end of standard volume delivery and the cylinder discharge port $V_{STD}$=The standard volume derived from piston displacement in the cylinder of known cross section $T_{MUT}$=The time average temperature at the meter under test during the delivery of e standard volume $T_{PIST}$=The time average temperature at the metering piston during the delivery of the standard volume $\langle T_{CVFf}\rangle$=The spatial average fluid temperature in the connecting volume at the end of standard volume delivery $\langle T_{CVFi}\rangle$=The spatial average fluid temperature in the connecting volume at the initiation of standard volume delivery $\alpha_S$=The linear thermal expansion coefficient of the steel or other material comprising the connecting volume containment structure $\langle T_{CVSf}\rangle$=The spatial average temperature of the steel or other material comprising the connecting volume containment structure at the completion of standard volume delivery $\langle T_{CVSi}\rangle$=The spatial average temperature of the steel or other material comprising the connecting volume containment structure at the initiation of standard volume delivery Prior art bi-directional piston displacement type fluid flow rate standards do not employ the last term of Equation 1 in the calculation of average volumetric flow rate at the meter under test. The last term in Equation 1 is referred to as the connecting volume thermal stability effects term. If the spatial average temperature of the fluid in the connecting volume and steel comprising the connecting volume are equal at the initiation of and end of standard volume delivery representing no net gain or loss of thermal energy therein, the term has a value of zero. In that case Equation 1 is simplified to Equation 3 below.

$$\overline{V}_{MUT} = \overline{V}_{STD}\{1 + \beta(\overline{T}_{MUT} - \overline{T}_{PIST})\} \quad (3)$$

It can be shown that the $\{1+\beta(\overline{T}_{MUT}-\overline{T}_{PIST})\}$ term of Equation 3 equals the ratio of the average fluid density at the metering piston to the average fluid density at the meter under test during the period of standard volume delivery. Equation 3 then becomes Equation 4 below.

$$\overline{V}_{MUT} = \overline{V}_{STD}(\overline{\rho}_{PIST}/\overline{\rho}_{MUT}) \quad (4)$$

Equations 3 or 4 are utilized in conventional prior art bi-directional piston displacement type fluid flow rate standards to quantify the average volumetric flow rate of fluid at the meter under test from the average volumetric flow rate from the metering cylinder. Thermal stability in the fluid is controlled to the extent possible in these systems in an effort to reduce the connecting volume thermal stability effects term which is not quantified by equation 3 or 4. Observation of operating bi-directional piston displacement type fluid flow rate standards leads to the conclusion that in fact there typically can be a net loss or gain of thermal energy in the fluid traversing the connecting volume and the steel comprising the connecting volume structure during standard volume deliveries. The present invention provides the ability to calculate and apply all terms of Equation 1 to the determination of average volumetric fluid flow rate at the meter under test from the average volumetric fluid flow rate at the piston during delivery of a standard volume of fluid.

Temperature measurement is uncertain to some level. By reducing the ratio of connecting volume to the delivered standard fluid volume, a means of reducing the impact on uncertainty of average volumetric flow rate of fluid at the meter under test during standard volume delivery derived from temperature measurement uncertainty is achieved. The method of the present invention controls the piston to both minimize the dead volume in the cylinder after each standard volume delivery and to supply a standard volume quantity sufficient to produce a ratio of connecting volume to standard volume that assures a predetermined level of uncertainty of fluid flow rate at the meter under test given the uncertainty of temperature measurement and the thermal volumetric expansion coefficients of the working fluid and connecting volume piping material of construction. Additionally, preferred embodiments of the present invention utilize a plurality of metering pistons and cylinders to reduce the connecting volume piping between the metering cylinder outlet and the meter under test by 80% to 90% relative to the connecting volume piping required with prior art bi-directional piston displacement type fluid flow rate standards further reducing the ratio of connecting volume to standard volume and thus reducing the uncertainty of average volumetric flow rate at the meter under test.

Preferred embodiments of the present invention provide direct open access to one side of each metering piston for the installation of temperature measurement probes through the pistons into the working fluid. Measuring the working fluid temperature at the metering pistons provides improved determination of the standard volume fluid density as well as the spatial average fluid temperature in the connecting volume and the cylinder wall temperature derived from the fluid temperature contained therein. Prior art bi-directional piston displacement volumetric fluid flow rate standards do not provide a means to measure the fluid temperature at the metering piston. Fluid temperature measurement at the metering piston as achieved in the present invention provides an improved means of determining average volumetric fluid flow rate at the meter under test during standard volume delivery over what is now possible with prior art bi-directional piston displacement type volumetric fluid flow rate standards. In prior art bi-directional piston displacement type fluid flow rate standards, access to working fluid adjacent to the sides of the metering piston for temperature measurement is not practical.

BRIEF DESCRIPTION OF THE DRAWINGS

The above and other aspects, features and advantages of the present invention will be more apparent from the following detailed description taken in conjunction with the accompanying drawing, in which.

DETAILED DESCRIPTION OF THE FIRST EMBODIMENT

Figures 1, 2:
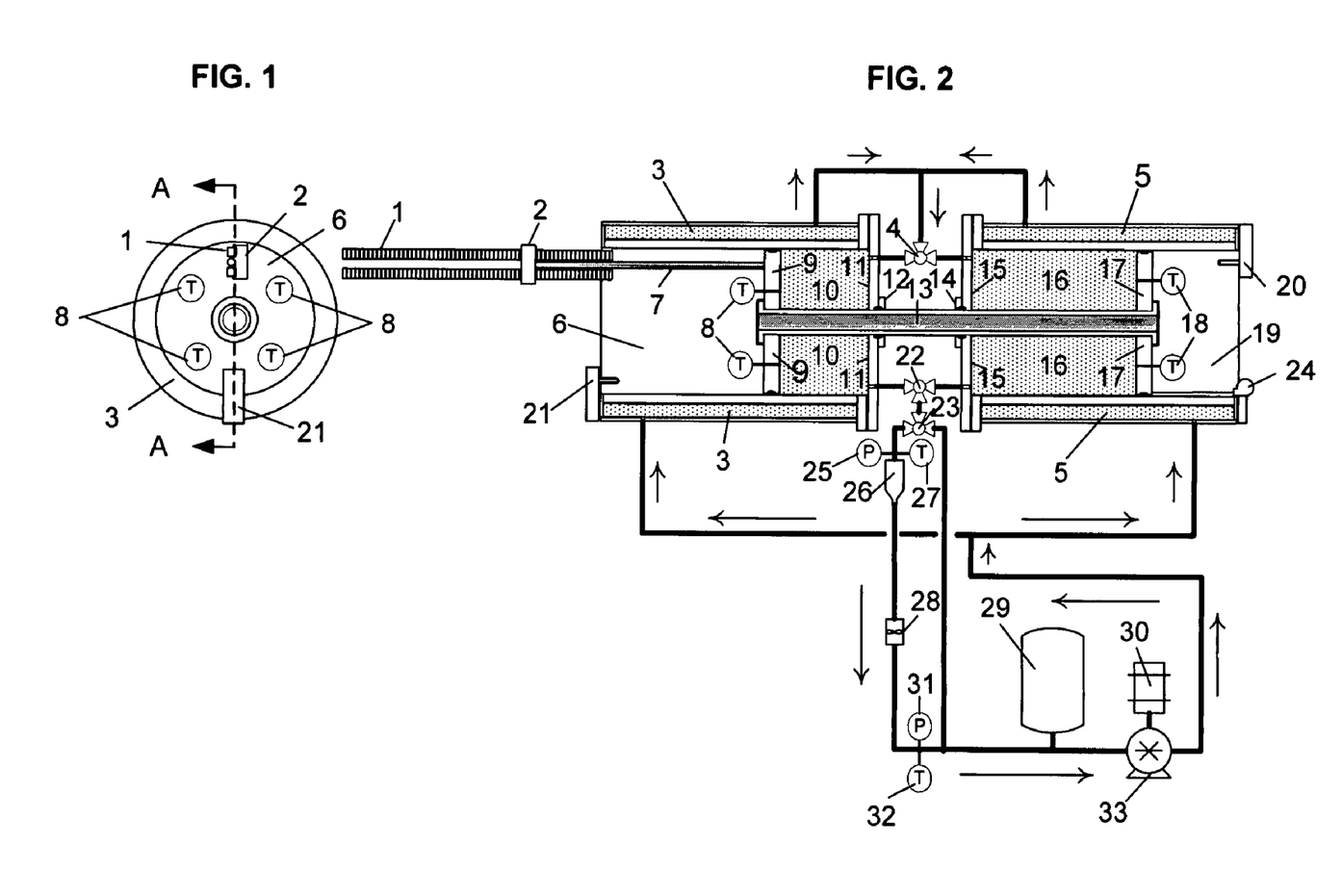
FIG. 1 is a view into the open end of one of the cylinders of the first embodiment of the present invention from which the sectional view part of FIG. 2 is selected.
FIG. 2 is a sectional view as denoted on FIG. 1 of the cylinders, pistons and shaft with an added plumbing schematic diagram for the first embodiment of the present invention.

In the first embodiment of the present invention for liquid service, two cylinders 6 and 19, each containing a fluid barrier piston 9 and 17, are axially aligned. The two pistons 9 and 17 are mechanically coupled via an interconnecting shaft 13 and move in unison as directed by the force of fluid being pumped into the cylinder chamber 10 or 16 receiving said fluid via three-way valve 4 after said fluid has passed under pressure through the jacketed volumes 3 and 5 surrounding the exteriors of both cylinders 6 and 19. The interconnecting shaft 13 passes through end plates 11 and 15 on the fluid chamber 10 or 16 end of the cylinders 6 or 19 via fluid barrier sealing mechanisms 12 and 14 around the outer surface of the shaft 13. The pressure of the fluid acting on the piston 9 or 17 in the cylinder fluid chamber 10 or 16 receiving the pumped fluid creates a motive force on the piston 9 or 17 in the second cylinder 6 or 19 via the mechanical coupling of the interconnecting shaft 13. The motive force on the second piston 9 or 17 causes the fluid in said cylinder fluid chamber 10 or 16 to flow through three-way valve 22 and further through three-way valve 23 where said fluid is directed either to bypass the meter under test 28 or into the flow conditioner 26 and piping directing fluid flow to the meter under test 28. After passage through the meter under test 28, the fluid, being pressurized by the gas pressure applied over the fluid in reservoir 29, passes into the inlet of positive displacement pump 33 which forces said fluid into the jacketed volumes 3 and 5 surrounding the exterior of both cylinders 6 and 19 then through three-way valve 4 and into the cylinder chamber 10 or 16 receiving fluid. Fluid flow rate is varied under computer control between test conditions by varying the speed of motor 30 driving the positive displacement pump 33.

When the pistons 9 or 17 reach the end of allowed travel in the cylinders 6 or 19, contact is made with limit switch 20 at the end of cylinder 19 or limit switch 21 at the end of cylinder 6 either of which cause the control system to actuate and switch the open paths in both three-way valves 4 and 22 to reverse the direction of piston travel by swapping which cylinder fluid chamber 10 or 16 is receiving fluid from the positive displacement pump 33 and which cylinder fluid chamber 10 or 16 is discharging fluid to the meter under test 28 during meter calibration. When required to accommodate the delivery of a standard volume of fluid which is much smaller than the total volume of one cylinder 6 or 19 to a meter under test 28 and to additionally cause the delivery of said volume to end with the metering piston 9 or 17 at the discharge end of the cylinder 6 or 19 in which it travels, three-way valve 23 can be actuated to provide a low resistance path for fluid flow around the meter under test 28 and the pumping flow rate increased to cause the pistons 9 and 17 to move quickly to optimum starting points for the standard volume delivery at which time the pumping rate is reduced to the desired test flow rate and three-way valve 23 reversed to direct a standard fluid flow rate through the meter under test 28. Metering piston 9 or 17 position in cylinders 6 or 19 is determined by position sensor 24. Direction of piston travel is determined by derivation of the position sensor 24 output during piston 9 and 17 travel. Alternately, monitoring the actions of end of travel limit switches 20 and 21 and counting pulses from optical encoders 1 provides a measure of the positions of pistons 9 and 17. However, end of travel limit switches 20 and 21 could be manually actuated at will to reverse the direction of piston travel and lead to confused status of actual piston position. Use of position sensor 24 to determine meter piston 9 or 17 position and direction of travel is the preferred method of the present invention.

The standard volume of fluid is determined by measuring the displacement of the metering piston 9 or 17 via optical encoders 1 and sensing head 2 which moves with the metering pistons 9 and 17 via connecting rod 7. Knowing from dimensional calibration the cross sectional area of the cylinders 6 and 19 and adjusting according to temperature measurements from probes 8 or 18, the measured displacement of the metering piston 9 or 17 provides calculation of the standard volume. The measured time to displace the standard volume provides the additional parameter required for calculation of the average fluid flow rate generated at the piston 9 or 17 of the discharging cylinder 6 or 19 during the standard volume delivery. Determining the average fluid flow rate at the meter under test 28 during the standard volume delivery requires the employment of Equation 1 which takes into account the thermal effects on fluid density and connecting volume piping during the time that the standard volume is being delivered. Fluid temperature measurement probes 8, 18, 27 and 32 provide the fluid temperature profile during standard volume delivery with which the data acquisition and control computer can make the required calculations to determine average fluid flow rate at the meter under test 28 relative to the average standard fluid flow rate at the metering piston 9 or 17. Fluid pressure measurements are made on both the upstream and downstream sides of the meter under test 28 using pressure transducers 25 and 31. Reservoir 29 is charged to supply a fluid pressure above the vaporization point of liquid working fluids at all points in the process and in particular at the outlet of the meter under test 28 during calibration operations.

Figure 3:
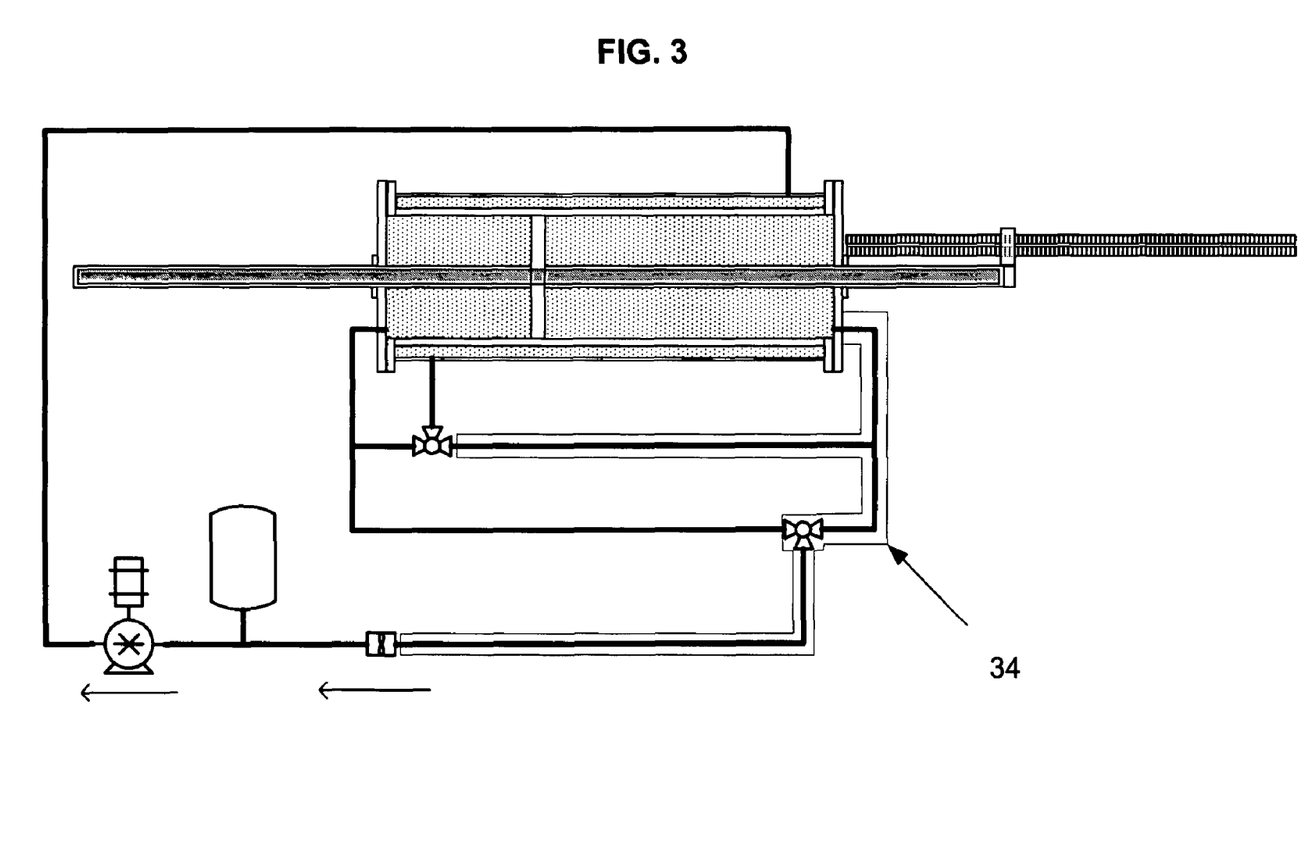
FIG. 3 is a basic process diagram of prior art bi-directional piston displacement type volumetric fluid flow rate standards with the required connecting volume piping highlighted by enclosure in dashed lines.

FIG. 3 depicts a basic process diagram of prior art bi-directional piston displacement fluid flow rate delivery and metering systems. The connecting volume piping of the prior art with the piston moving left to right is identified as 34 and outlined by dashed lines. Had the delivery of a standard volume ended with the piston in the position shown, the remaining volume of fluid in the cylinder to the right of the piston summed with the connecting volume piping volume would comprise the total connecting volume for the given standard volume delivered.

Figure 4:
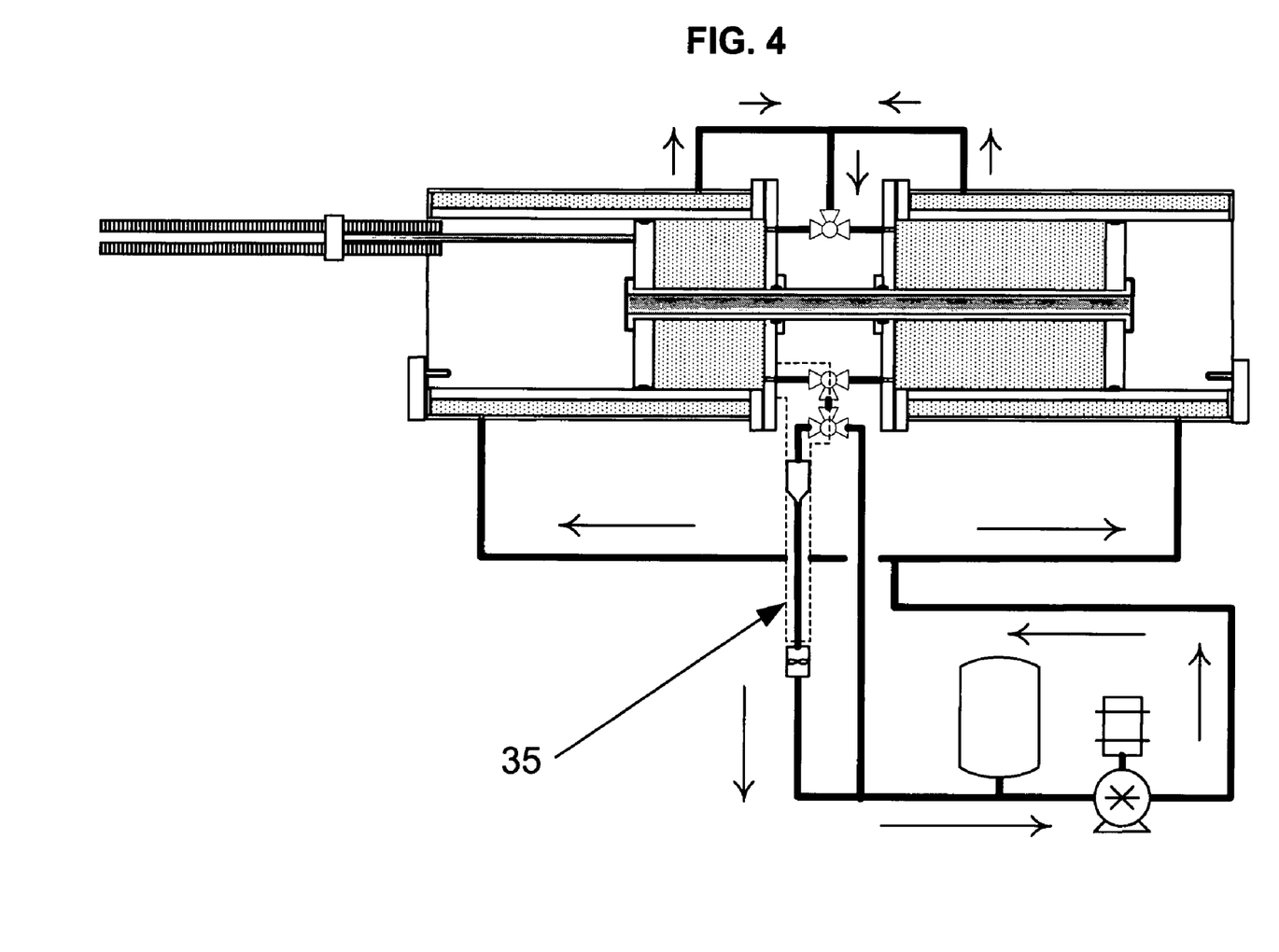
FIG. 4 is a basic process diagram of the present invention with the required connecting volume piping highlighted by enclosure in dashed lines for comparison with the prior art required connecting volume piping.

FIG. 4 depicts the basic process diagram of the first embodiment of the present invention. The connecting volume piping of the present invention with the pistons moving left to right is identified as 35 and outlined by dashed lines. The method of the present invention requires the delivery of a standard volume to end with the metering piston at the discharge end of the cylinder. In that case, only the volume of the connecting volume piping 35 comprises the connecting volume. The much reduced required connecting volume piping of the present invention 35 and the operational method of the present invention contribute to enhanced uncertainty of delivered flow rate at meters under test relative to that achieved by the prior art.

Figure 5:
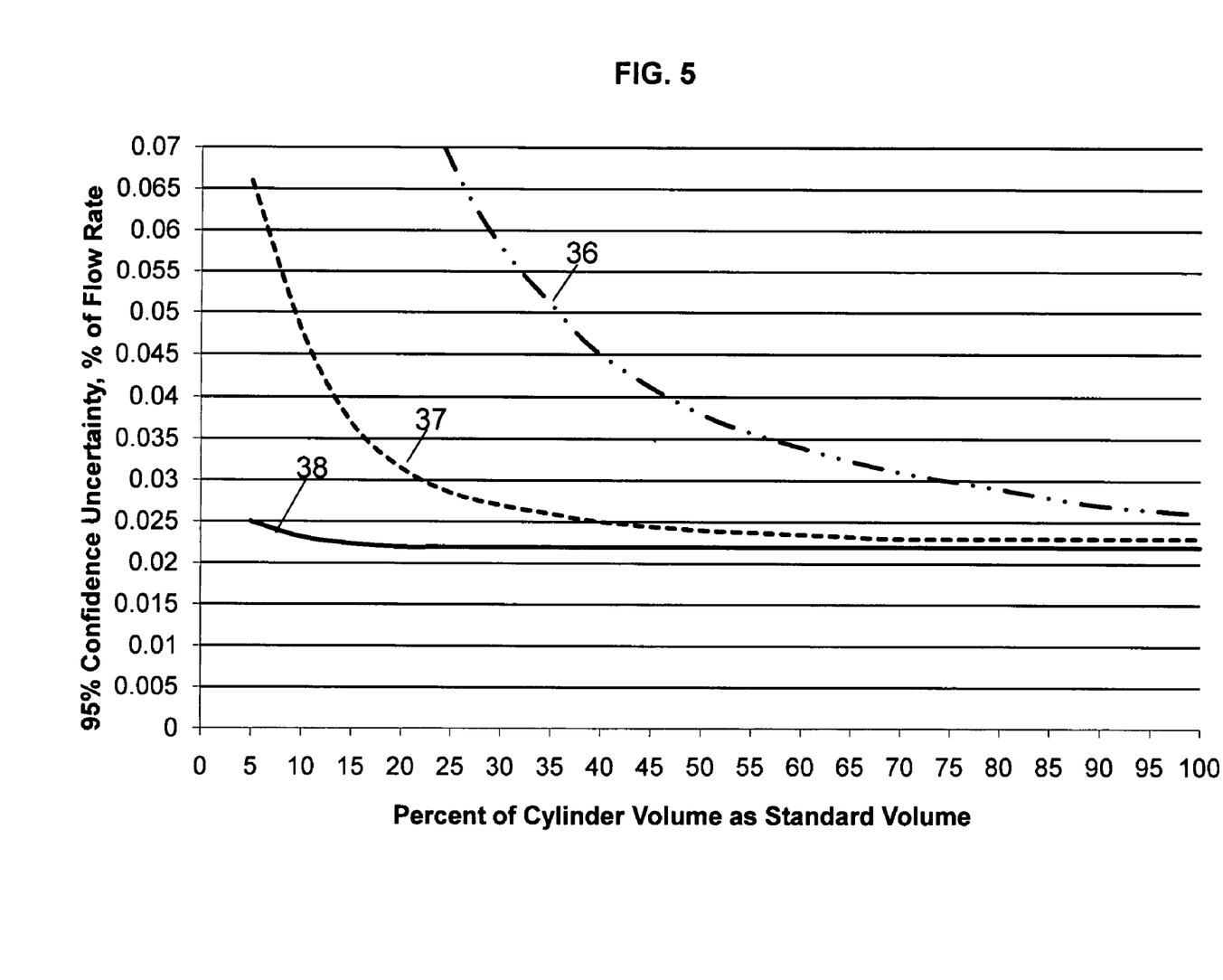
FIG. 5 is a graphical comparison of typical 95% confidence interval uncertainty of delivered volumetric flow rate at meters under test between prior art bi-directional piston displacement type volumetric fluid flow rate calibration systems and methods, that achieved by the method of the present invention applied to prior art systems and the present invention system and method; all versus delivered standard volume as percent of total metering cylinder volume given equal dimensional, timing, temperature measurement and other operational parameter uncertainties and equal fluid volumetric thermal expansion coefficient, $\beta$.

FIG. 5 displays as plot 36 the typical uncertainty of prior art bi-directional piston displacement fluid flow rate delivery and metering systems. These prior art systems do not control the starting and ending locations of the metering piston relative to the discharge end of the metering cylinder. Given the additional uncertainty of a number of dimensional, timing and temperature measurement parameters along with the thermal expansion coefficient of the working fluid, plot 36 does represent typical uncertainty of delivered fluid flow rate at meters under test for the prior art. Plot 37 displays the typical improvement in uncertainty of delivered fluid flow rate at meters under test to be gained by implementing the method of the current invention on prior art bi-directional piston displacement type fluid flow rate delivery and metering systems. Finally, plot 38 displays the additionally improved uncertainty of delivered fluid flow rate at meters under test achieved by the present invention with dimensional, timing and temperature measurement uncertainties equal to the prior art denoted in plots 36 and 37. These graphed uncertainties are all relative to the percent of metering cylinder volume delivered as fluid standard volume. As is apparent in FIG. 5, the present invention provides enhanced uncertainty of fluid flow rate at meters under test with the additional advantage of requiring a smaller delivered standard volume and thus less time for meter calibration while achieving a best level of said uncertainty.

The above description of the first embodiment of the present invention is not the only embodiment which achieves the advantages in the claims. One additional embodiment suited to both gaseous and liquid fluids can be configured by replacing the fluid pump 33 with a linear drive mechanism to drive the pistons back and forth in the cylinders with the pistons being mechanically coupled as denoted in this description of the first embodiment. The linearly driven pistons would then serve to both move the fluid and with the optical encoders and known cylinder cross sectional area, meter the delivered standard volume. Yet other embodiments with a plurality of pistons and cylinders configured to achieve a reduced connecting volume piping requirement are possible.

The invention claimed is:

1. An apparatus for calibrating fluid flowmeters, comprising;

(a) a plurality of fluid containers interconnected with conduit piping as a closed fluidic circuit with a flowmeter under test;
(b) said closed fluidic circuit being filled with a working fluid;
(c) said working fluid having properties appropriate for calibration of the flowmeter under test;
(d) said plurality of fluid containers each having a working fluid flow metering piston slidably mounted therein;
(e) each of said fluid containers having working fluid inlet ports and working fluid outlet ports located to alternately receive and discharge working fluid on only one side of the working fluid flow metering pistons slidably mounted therein;
(f) said working fluid flow metering pistons moving proportionally with working fluid flow in each of the fluid containers in which mounted and moving bi-directionally with directional dependence on working fluid flow into and out of the fluid containers;
(g) a means for motivating the working fluid flow through the interconnecting conduit piping and the flowmeter under test and into one portion of the plurality of fluid containers and out of a second portion of the plurality of fluid containers;
(h) a means for reversing direction of the working fluid flow relative to the plurality of fluid containers while maintaining unidirectional flow of the working fluid through the flowmeter under test;
(i) a means for quantifying a volume of the working fluid displaced by the working fluid flow metering pistons in the plurality of fluid containers during a measured period of time;

whereby said apparatus meters and delivers the working fluid flow from a portion of the plurality of fluid containers to the flowmeter under test while receiving back said working fluid flow after passage through the flowmeter under test into a second portion of the plurality of fluid containers.

2. An apparatus for calibrating fluid flowmeters as in claim 1 in which the plurality of fluid containers with working fluid flow metering pistons slidably mounted therein are cylinders.

3. An apparatus for calibrating fluid flowmeters as in claim 1 further comprising;
(a) a means for quantifying the working fluid volume between the flowmeter under test and the working fluid flow metering pistons metering working fluid flow to the flowmeter under test;
(b) a means of determining spatial average working fluid temperature between the flowmeter under test and the working fluid flow metering pistons metering working fluid flow to the flowmeter under test at instants in time;
(c) a means of determining temporal average temperature of working fluid at the working fluid flow metering pistons metering working fluid flow to the flowmeter under test and at the flowmeter under test during intervals when working fluid is being delivered to said flowmeter under test;

whereby working fluid flow rate delivered at the flowmeter under test can be calculated from working fluid flow rate metered by displacement of the working fluid flow metering pistons with consideration given to thermal expansion and contraction of the working fluid in a connecting volume between the working fluid flow metering pistons and the flowmeter under test during time periods of standard volume delivery.

4. An apparatus for calibrating fluid flowmeters as in claim 1 further comprising a means for measuring pressure of the working fluid inside the plurality of fluid containers and adjacent to the flowmeter under test;

whereby the compressibility of the working fluid can be accounted for when the working fluid is gaseous.

5. A method for calibrating fluid flowmeters utilizing the apparatus of claim 1, comprising:
(a) installing the flowmeter under test;
(b) delivering standard volumes of working fluid to the flowmeter under test at flow rates appropriate for calibration of said flowmeter under test;
(c) controlling start of travel and end of travel positions of the working fluid flow metering pistons relative to the outlets of the fluid containers in which the working fluid flow metering pistons reside to produce a predetermined standard volume quantity and connecting volume quantity;
(d) acquiring response data from the flowmeter under test and analyzing said response data relative to delivered working fluid flow;

whereby volume of working fluid between the working fluid flow metering pistons and the flowmeter under test is controlled for each working fluid standard volume delivery and ratio of working fluid connecting volume to working fluid standard volume is controlled for each working fluid standard volume delivery to assure meeting a predetermined uncertainty of working fluid flow rate delivered to the flowmeter under test.

\* \* \* \* \*